United States Patent [19]

Sands et al.

[11] 4,395,231

[45] Jul. 26, 1983

[54] METHODS OF AND APPARATUS FOR SINTERING TUBULAR CERAMIC ARTICLES

[75] Inventors: Gilbert Sands, Northwich; Ian H. Jennens, Chester, both of England

[73] Assignee: Chloride Silent Power Limited, London, England

[21] Appl. No.: 316,715

[22] Filed: Oct. 30, 1981

[30] Foreign Application Priority Data

Nov. 6, 1980 [GB] United Kingdom ............... 8035728

[51] Int. Cl.³ .............................................. F27D 3/00
[52] U.S. Cl. .................................... 432/11; 414/214; 414/280; 432/124; 432/239
[58] Field of Search ................... 432/11, 124, 239; 294/95; 414/214, 280

[56] References Cited

U.S. PATENT DOCUMENTS 2,381,656  8/1945  Eksergian et al. ................. 414/214
3,230,596  1/1966  Batigne et al. ..................... 432/124
3,265,431  8/1966  Burner ................................ 294/95
4,070,542  1/1978  Miles et al. .................... 219/10.49 R
4,291,910  9/1981  Maupate ............................ 294/95

FOREIGN PATENT DOCUMENTS 2059557  4/1981  United Kingdom ................. 432/11

Primary Examiner—John J. Camby
Attorney, Agent, or Firm—Beveridge, DeGrandi and Kline

[57] ABSTRACT

In a pass-through sintering furnace for sintering a succession of ceramic tubes fed lengthwise through the furnace and rotated as they pass through the furnace, the tubes, when heated in the furnace, are kept apart by pushing each tube into the furnace at one end and pulling it out from the other end. The pulling speed is less than the pushing speed to ensure uniform firing throughout the length of the tube, allowing for shrinkage as the tube is fired, but is sufficient to hold the pulled tube clear of the next following tube so as to obviate any pushing against the end of a hot tube.

13 Claims, 2 Drawing Figures

METHODS OF AND APPARATUS FOR SINTERING TUBULAR CERAMIC ARTICLES

BACKGROUND OF THE INVENTION

1. Field of the Invention

This invention relates to methods of and apparatus for sintering tubular ceramic articles and is concerned particularly with the construction and use of a pass-through furnace for this purpose.

2. Prior Art

Pass-through sintering furnaces find particular application in firing ceramic articles where the duration of firing and the firing conditions must be carefully controlled. Such furnaces are used for example in the manufacture of beta-alumina ceramic tubes for use as a solid electrolyte in electrochemical cells and energy conversion devices. As is described for example in U.S. Pat. Nos. 3,922,176; 3,950,463; 4,059,663 and 4,070,542, beta-alumina ceramic tubes may be formed as a green body and sintered by passing them rapidly through a furnace having a sintering zone which may be short compared with the length of each article. The article may be passed through such a furnace quite quickly so that the sintering time is typically less than 2 minutes. It is important that the article, if it is to be uniformly treated over its whole length, should be moved at a substantially uniform speed through the sintering zone of a furnace. For tubular articles, the furnace preferably has a rotatable firing tube through which the articles pass, these articles being moved longitudinally through this tube but allowed to roll as the furnace tube rotates. This rotation of the furnace tube gives improved uniformity of sintering conditions and improved straightness of the articles being fired. With such a technique, the articles cannot be carried through the furnace on a conveyor system and heretofore the technique that has been employed is to push the articles into and through the furnace. To give uniform firing, a succession of articles, possibly separated with spacers, can be pushed through the furnace. Typically beta-alumina ceramic tubes, such as are used in sodium sulphur cells as a solid electrolyte, might be fed into and through the furnace at 80 mm per minute.

The article before it enters the furnace is a green shape, essentially a pressed compact of powder material. As the shape passes through the furnace and is heated up, it becomes softer and slightly plastic and one of the problems which occurs in the firing of ceramic tubes, using a push-through technique as described above, is that the shape of the tube may be distorted by the loads induced by pushing of a series of tubes. In particular, if an open-ended tube is pushed, rubbing occurs at the open end as the tube is pushed and rotated. Furthermore tubes may tend to bend slightly as they soften when heated. Tubes of this nature are commonly made with one closed end, this end being domed to give adequate strength. Pushing on the domed end gives a localised load which again may distort the shape of the tube.

SUMMARY OF THE INVENTION

According to one aspect of the present invention, a method of moving ceramic tubes into and through a pass-through sintering furnace comprises pushing a succession of the tubes into the furnace at a uniform speed and, at the exit and of the furnace, gripping each tube as it leaves the furnace and pulling the tube forwardly at a uniform speed which is less than the speed at which the tubes are fed into the furnace but sufficient to hold the pulled tube clear of the next following tube.

As each tube enters the furnace and is sintered, it shrinks. The shrinkage might typically be of the order of 10 to 12% of the length. This shrinkage may readily be determined empirically for any given material and firing conditions. If the tube is to be fired uniformly throughout its length, then the speed at which it has to be pulled out must be less than the speed at which it enters by a factor corresponding to the shrinkage. This technique reduces the pushing force required in feeding tubes into the furnace and obviates the need for pushing against the end of a hot tube during the whole of its passage through the furnace. In particular, if the length of a tube to be sintered is such that the tube can be gripped at one end and pulled before the other end has reached the firing region of the furnace, as is generally the case in sintering ceramic tubes using a pass-through furnace using the techniques described in the above-mentioned specifications, then this method of pulling the tube avoids any pushing against ends of the tubes as those ends pass through the sintering region of the furnace. Using this technique, it is preferable not to employ spacers between successive tubes. If such spacers were employed, they would either have to be pushed out by a following tube or would have to be pulled out by the tube pulling means. The absence of contact between the tubes in the sintering region of the furnace however obviates the need for spacers.

Conveniently each tube is pushed into the furnace by a mechanically driven pusher and is gripped and pulled from the furnace while the pusher is retracted for loading the next tube. Thus a succession of tubes can be fed through the furnace without tubes coming in contact with one another whilst the leading tube is being sintered.

The tubes may be rotated as they pass through the furnace. The furnace may comprise a cylindrical element which is rotated so that the tubes roll around the inside of the furnace as they pass through it. Provision may be made for rotating the tubes as they are fed into the furnace, for example by supporting each tube entering the furnace on a pair of parallel rollers having their axes parallel to the axis of the tube and rotating these rollers to cause the tube to rotate. Similarly means may be provided at the outlet end for rotating each tube as it is pulled out of the furnace.

According to another aspect of the present invention, an apparatus for moving ceramic tubes into and through a pass-through sintering furnace comprises means for pushing a succession of tubes, arranged axially in line, into the furnace at a uniform speed and means for gripping and pulling each tube as it leaves the furnace at a controlled speed less than the speed at which the tubes are pushed into the furnace but sufficient to hold the pulled tube clear of the next following tube. A controllable speed pulling mechanism may be provided for this purpose.

The means for gripping and pulling the tubes may include a gripper having a plurality of movable jaws arranged for gripping the external surface of a tube. Conveniently however if the tubes are open-ended, at least at the end initially leaving the furnace, then the means for gripping and pulling each tube may include a gripper comprising fingers or the like for insertion into the open end of a tube and movable radially outwardly to grip the tube.

Automatic control means may be provided for cyclically operating the pulling device in synchronism with the passage of tubes through the furnace.

For feeding tubes of a predetermined length through the furnace, the gripping means may be arranged to grip each tube at one end before the other end has reached the sintering region of the furnace.

For a furnace having means for rotating the tubes as they pass through the furnace, said means for gripping and pulling each tube as it leaves the furnace may comprise a gripper rotatably mounted on a puller to rotate with the tube and to continue its rotation as the tube is pulled out of the furnace.

The invention also includes within its scope a beta-alumina ceramic tube made by the above-described method.

DESCRIPTION OF THE PREFERRED EMBODIMENTS

Figure 1:
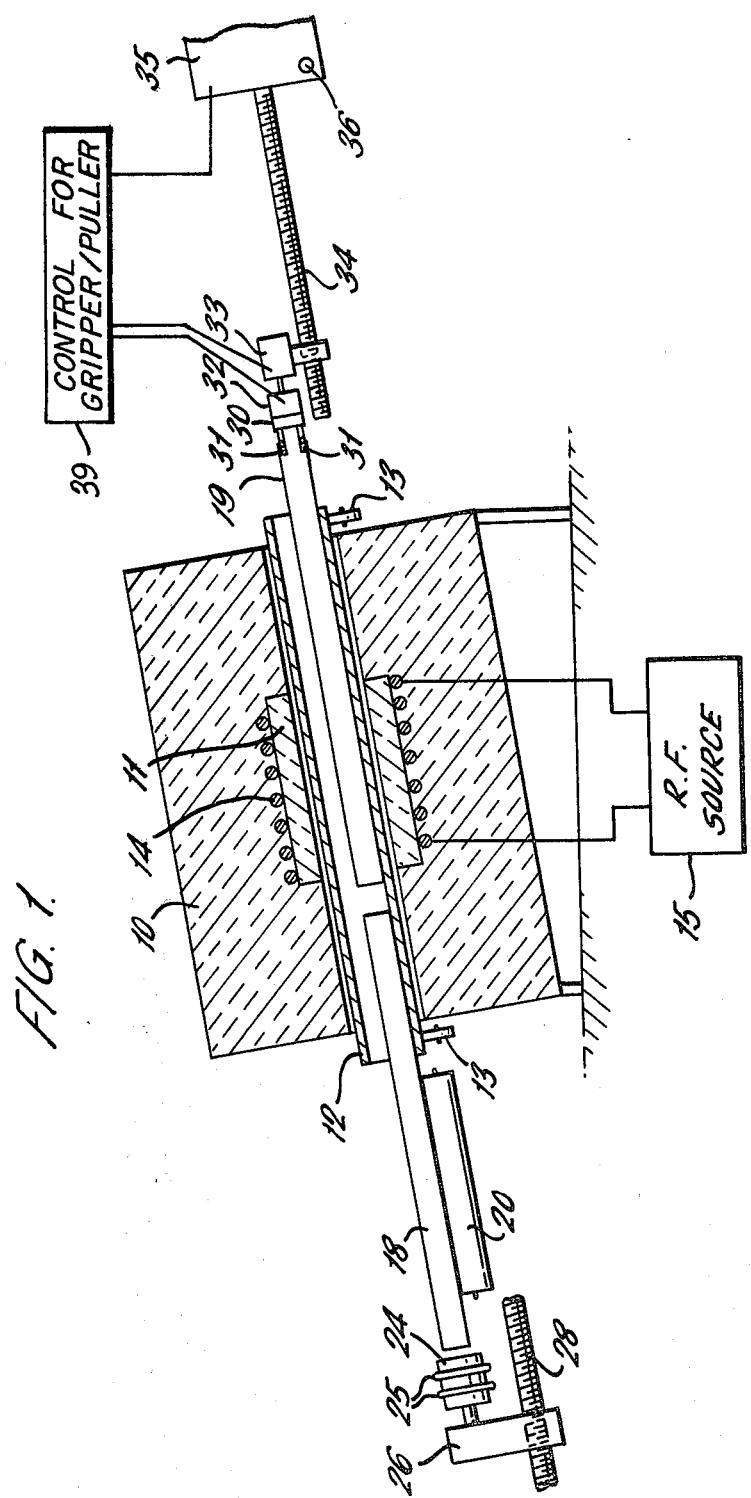
FIG. 1 is a diagrammatic illustration of an induction furnace for sintering a polycrystalline beta-alumina ceramic electrolyte tube.

Referring to FIG. 1 there is shown diagrammatically an induction furnace for zone sintering of beta-alumina ceramic tubes which are passed through the furnace. This furnace comprises an insulated furnace box 10 with a graphite susceptor block 11. Passing through the susceptor block 11 and furnace box 10 is a furnace tube 12 typically formed of recrystallised alumina, which furnace tube is continuously rotated at uniform speed resting on rollers 13. Typically a rotation speed of 15 r.p.m. is used. An induction coil 14 energised from a radio frequency source 15 is arranged around the susceptor block 11.

The furnace tube 12 slopes upwardly at an angle of about $7\frac{1}{2}°$ from the entry end to the exit end to give a convective air flow through the furnace towards the exit end. Green ceramic tubes to be fired such as the tube 18 are fed into the furnace tube 12 by sliding along a pair of parallel rollers 20 which have their axes parallel to one another and parallel to the axis of a tube to be fired. The two rollers 20 are close together so that the tube 18 to be fired can rest on these rollers. The rollers 20 are driven at the same uniform rotational speed and in the same direction and, by frictional engagement with the tubes to be fired, they rotate these tubes. The rollers 20 are driven so that their peripheral speed is the same as the required peripheral speed of the tubes as they pass through the rotating furnace tube 12. The tubes, such as the tubes 18, 19 are pushed along the rollers 20 by means of a cylindrical pusher element 24 having elastomeric 0-rings 25 engaging the rollers 20, the pusher elements being carried on a support 26 and being rotated by the engagement of the 0-rings 25 with the roller so as to rotate with the tubes being pushed. For this purpose the pusher element 24 is mounted for free rotation about its axis on the linearly movable pusher 26. This pusher is moved linearly by means of a lead screw 28 which is driven so that the tubes to be fired are pushed through the furnace at a uniform linear speed of typically 80 mm per minute.

Periodically the pusher 26 is withdrawn rapidly for a sufficient distance to allow a fresh green tube to be inserted between the pusher element 24 and the tube 18 previously being pushed, the slow forward drive then being resumed.

At the outlet end of the furnace tube 12, the tubes, such as tube 19, are gripped, at or near that end, by a gripper 30 typically having two or more fingers 31 which are pivotally or flexibly movable outwardly under the control of a control member 32 so that, when inserted in the open end of a tube 19, they will grip the tube. The gripper 30 is rotatably mounted on a puller 33 driven by a lead screw 34 which is rotated by means of a drive mechanism 35 including speed control means indicated diagrammatically at 36. Alternatively the pulling mechanism may be driven from the pusher lead screw 28 via a fixed ratio drive means. The drive means for the puller includes a fast return drive. A limit switch or the like (not shown) is provided for automatically releasing the gripper when the tube has been drawn out of the furnace a sufficient distance. The gripper may be hydraulically or pneumatically operated. Provision may be made for automatic operation of the gripper means to grip a tube when the gripper fingers 31 enter the end of the tube 19. An automatic control means is shown at 39 in FIG. 1 for cyclically operating the gripping and/or pulling means in synchronism with the passage of tubes through the furnace.

Figure 2:
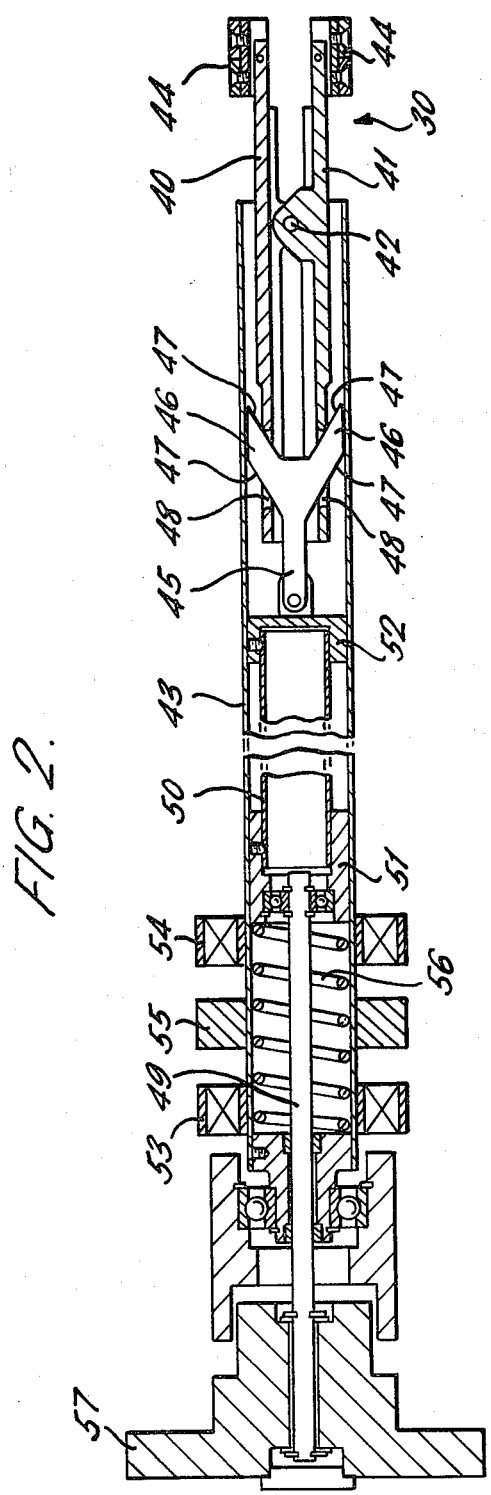
FIG. 2 illustrates in further detail part of a gripping and pulling mechanism used in the furnace of FIG. 1.

One construction of puller is illustrated in FIG. 2. The gripper 30 comprises two levers 40, 41 pivoted to one another at 42, the pivot pin being journalled in an outer tube 43. At the outer ends of the two levers, where they extend beyond the end of tube 43, are gripper pads 44 of electrically insulating material. The pads 44 with the lever arms 40, 41 constitute the aforementioned fingers 31. A Y-shaped member 45 has two arms 46 with surfaces 47 forming camming surfaces bearing against one or other end of slots 48 in the levers 40, 41 if the member 45 is moved axially with respect to the tube 43. The sloping surfaces 47 cause the gripper pads 44 to move together if the member 45 is moved to the left and cause the pads 44 to move apart if the member 45 is moved to the right. Axial linear movement of the member 45 is effected by means of a shaft 49 and tube 50 carried on slides 51, 52 in the tube 43. The gripper pads 44 with the levers 40, 41 and tube 43 are rotatably mounted in bearings 53, 54 and thus can rotate with the tube being sintered as it is pulled from the furnace. In the embodiment illustrated, a pulley 55 between the bearings is fixedly mounted on the tube 43 for rotationally driving the tube, by a belt drive, at the required speed.

The drive means for linear movement of the gripper are driven so as to pull the tube out from the furnace at a constant but slower speed than the speed at which the tubes are pushed into the furnace. As they pass through the furnace, the tubes shrink in length and the ratio of the speed of movement of the puller to that of the pusher is equal to or very slightly greater than the ratio of the shrunk length of a tube to the length of the green body before firing. This ensures that tubes, as they pass through the furnace, separate from one another and are pulled out by the gripper 30 and are not pushed through the furnace by pushing a succession of tubes.

In the embodiment illustrated, the length of the tubes is such that each tube 18, 19 is gripped at one end by the fingers 31 and pulled onwardly before the other end of that tube has reached the sintering zone inside the inductor. As shown, one tube pushes the next tube part of the way into the furnace. The pulling starts however before the rear end of the leading tube has reached the sintering zone. This prevents any pushing on a hot end of a tube and so reduces any damage or deformation of the tubes. If the tubes are sufficiently long, each tube may be pushed into the furnace by the pusher 24, 26 and gripped by the gripper 30, 31 so as to be pulled onwardly, the pusher then being retracted for insertion of the next tube for firing, so avoiding any contact between tubes in the furnace.

A spring 56 in the tube 43 urges the tube 50 to the right causing the gripper pads to tend to move apart and so to grip a tube being passed through the furnace. The tube may be released manually by means of axial movement of a handle 57 on the end of rod 49. Automatic actuating means, e.g. a pneumatic actuator may be provided if the operation is to be automated.

We claim:

1. A method of moving ceramic tubes into and through a pass-through sintering furnace comprising pushing a succession of the tubes into the furnace at a uniform speed and, at the exit end of the furnace, gripping each tube as it leaves the furnace and pulling the tube forwardly at a uniform speed which is less than the speed at which the tubes are fed into the furnace but sufficient to hold the pulled tube clear of the next following tube.

2. A method as claimed in claim 1 wherein each tube is gripped at one end and pulled before the other end has reached the firing region of the furnace.

3. A method as claimed in claim 1 wherein the tubes are rotated as they pass through the furnace.

4. A method as claimed in claim 1 wherein the furnace comprises a cylindrical element which is rotated so that the tubes roll around the inside of the furnace as they pass through it.

5. A method as claimed in claim 3 wherein the tubes are rotated as they are fed into the furnace.

6. A method as claimed in claim 3 wherein each tube is rotated as it is pulled out of the furnace.

7. A method as claimed in claim 1 wherein each tube is pushed into the furnace by a mechanically driven pusher and is gripped and pulled from the furnace while the pushed is retracted for loading the next tube.

8. An apparatus for moving ceramic tubes into and through a pass-through sintering furnace comprising means for pushing a succession of tubes, arranged axially in line, into the furnace at a uniform speed and means for gripping and pulling each tube as it leaves the furnace at a controlled speed less than the speed at which the tubes are fed into the furnace but sufficient to hold the pulled tube clear of the next following tube.

9. Apparatus as claimed in claim 8 wherein said means for gripping and pulling each tube includes a controllable speed pulling mechanism.

10. Apparatus as claimed in claim 8 and for use with tubes which are open-ended, at least at the end initially leaving the furnace, wherein the means for gripping and pulling each tube includes a gripper comprising fingers for insertion into the open end of a tube and movable radially outwardly to grip the tube.

11. Apparatus as claimed in claim 8 wherein automatic control means are provided for cyclically operating the gripping or pulling means in synchronism with the passage of tubes through the furnace.

12. Apparatus as claimed in claim 8 and for feeding tubes of a predetermined length through the furnace, wherein the gripping and pulling means are arranged to grip each tube at one end thereof before the other end has reached the sintering region of the furnace.

13. Apparatus as claimed in claim 8 and having means for rotating tubes as they pass through the furnace, wherein said means for gripping and pulling each tube as it leaves the furnace comprises a puller with a gripper rotatably mounted on said puller to rotate with the tube and to continue its rotation as it is pulled out of the furnace.

* * * * *